United States Patent
Saito et al.

(10) Patent No.: US 9,371,461 B2
(45) Date of Patent: Jun. 21, 2016

(54) INK, INK CARTRIDGE AND INK JET RECORDING METHOD

(75) Inventors: Arihiro Saito, Saitama (JP); Kenji Moribe, Fujisawa (JP); Mikio Sanada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 481 days.

(21) Appl. No.: 13/442,359

(22) Filed: Apr. 9, 2012

(65) Prior Publication Data

US 2012/0268518 A1 Oct. 25, 2012

(30) Foreign Application Priority Data

Apr. 19, 2011 (JP) ................................ 2011-093360
Mar. 29, 2012 (JP) ................................ 2012-076529

(51) Int. Cl.
| | | |
|---|---|---|
| *B41J 2/01* | (2006.01) | |
| *C09D 11/322* | (2014.01) | |
| *C09D 11/32* | (2014.01) | |
| *B41J 2/21* | (2006.01) | |
| *B41J 2/175* | (2006.01) | |

(52) U.S. Cl.
CPC ............ *C09D 11/322* (2013.01); *B41J 2/17503* (2013.01); *B41J 2/2107* (2013.01); *C09D 11/32* (2013.01)

(58) Field of Classification Search
CPC ........ B41J 2/01; B41J 2/2107; B41J 2/17503; C09D 11/30; C09D 11/322; C09D 11/38; C09D 11/40
USPC .......... 347/104, 86, 95–100; 106/31.6, 31.65, 106/31.75, 31.78
See application file for complete search history.

(56) References Cited

U.S. PATENT DOCUMENTS

| | | |
|---|---|---|
| 5,451,251 A | 9/1995 | Mafune et al. |
| 5,571,313 A | 11/1996 | Mafune et al. |
| 5,911,815 A | 6/1999 | Yamamoto et al. |
| 6,027,210 A | 2/2000 | Kurabayashi et al. |
| 6,062,674 A | 5/2000 | Inui et al. |
| 6,174,354 B1 | 1/2001 | Takizawa et al. |
| 6,221,141 B1 | 4/2001 | Takada et al. |
| 6,280,513 B1 | 8/2001 | Osumi et al. |
| 6,332,919 B2 | 12/2001 | Osumi et al. |
| 6,375,317 B1 | 4/2002 | Osumi et al. |
| 6,425,662 B1 | 7/2002 | Teraoka et al. |
| 6,511,534 B1 | 1/2003 | Mishina et al. |
| 6,706,105 B2 | 3/2004 | Watanabe et al. |
| 7,005,461 B2 | 2/2006 | Sanada et al. |
| 7,160,376 B2 | 1/2007 | Watanabe et al. |
| 7,276,110 B2 | 10/2007 | Tsujimura et al. |
| 7,276,112 B2 | 10/2007 | Tokuda et al. |
| 7,347,890 B2 | 3/2008 | Nito et al. |
| 7,371,274 B2 | 5/2008 | Sanada et al. |
| 7,402,200 B2 | 7/2008 | Imai et al. |
| 7,605,192 B2 | 10/2009 | Sanada et al. |
| 7,635,182 B2 | 12/2009 | Hakamada et al. |
| 7,682,433 B2 | 3/2010 | Yanagimachi et al. |
| 7,695,099 B2 | 4/2010 | Sanada et al. |
| 7,699,924 B2 | 4/2010 | Mafune et al. |
| 7,753,515 B2 | 7/2010 | Tokuda et al. |
| 7,846,247 B2 | 12/2010 | Mizutani et al. |
| 7,862,653 B2 | 1/2011 | Sanada et al. |
| 7,878,643 B2 | 2/2011 | Kudo et al. |
| 7,947,762 B2 | 5/2011 | Udagawa et al. |
| 7,988,277 B2 | 8/2011 | Moribe et al. |
| 8,007,097 B2 | 8/2011 | Sanada et al. |
| 8,016,406 B2 | 9/2011 | Hakamada et al. |
| 8,016,932 B2 | 9/2011 | Okamura et al. |
| 8,217,097 B2 | 7/2012 | Udagawa et al. |
| 8,273,168 B2 | 9/2012 | Kakikawa et al. |
| 8,616,695 B2* | 12/2013 | Mori et al. ..................... 347/100 |
| 8,858,695 B2 | 10/2014 | Gu et al. |
| 8,927,623 B2 | 1/2015 | Goto |
| 2004/0107986 A1* | 6/2004 | Neilson et al. ................ 136/204 |
| 2007/0097155 A1 | 5/2007 | Imai et al. |
| 2007/0100023 A1* | 5/2007 | Burns et al. ................... 523/160 |
| 2007/0100024 A1 | 5/2007 | Gu et al. |
| 2007/0112095 A1 | 5/2007 | Moribe et al. |
| 2008/0233363 A1 | 9/2008 | Goto |
| 2010/0196601 A1* | 8/2010 | Goto et al. .................... 427/256 |
| 2010/0201769 A1* | 8/2010 | Kakikawa et al. ............ 347/100 |
| 2011/0102497 A1* | 5/2011 | Sato et al. ....................... 347/21 |

(Continued)

FOREIGN PATENT DOCUMENTS

| | | |
|---|---|---|
| CN | 101379143 A | 3/2009 |
| CN | 101838485 A | 9/2010 |

(Continued)

OTHER PUBLICATIONS

Dec. 17, 2013 Chinese Office Action in Chinese Patent Application No. 201210117239.8.

(Continued)

*Primary Examiner* — Matthew Luu
*Assistant Examiner* — Rut Patel
(74) *Attorney, Agent, or Firm* — Fitzpatrick, Cella, Harper & Scinto

(57) ABSTRACT

The present invention preferably provides an ink including an organic pigment, a water-soluble resin and a surfactant that allows images having high color developability to be obtained independently of the type of recording medium, even when a small amount of ink is applied. Preferably, the organic pigment is a phosphonic acid-type self-dispersible pigment, the acid value of the water-soluble resin is 100 mg KOH/g to 160 mg KOH/g, the surfactant is an ethylene oxide adduct of a higher alcohol selected from the group consisting of a linear primary alcohol, a linear secondary alcohol and an isoalkyl alcohol, the HLB value of the surfactant as determined by the Griffin method is 13.0 or more, and the mass ratio of the content (% by mass) of the surfactant in the ink to the content (% by mass) of the water-soluble resin in the ink is 0.07 to 0.70.

11 Claims, No Drawings

(56) References Cited

U.S. PATENT DOCUMENTS

| | | | |
|---|---|---|---|
| 2011/0141190 A1 | 6/2011 | Moribe et al. | |
| 2011/0277663 A1 | 11/2011 | Sanada et al. | |
| 2012/0268521 A1* | 10/2012 | Moribe et al. | 347/21 |
| 2012/0268536 A1* | 10/2012 | Saito et al. | 347/96 |
| 2016/0075880 A1 | 3/2016 | Gu et al. | |

FOREIGN PATENT DOCUMENTS

| | | | | |
|---|---|---|---|---|
| JP | 2001-081378 A | 3/2001 | | |
| JP | 2006-045514 A | 2/2006 | | |
| JP | 2008-050400 A | 3/2008 | | |
| JP | 2009-513802 A | 4/2009 | | |
| JP | 2009-515007 A | 4/2009 | | |
| WO | 2005/068565 A1 | 7/2005 | | |
| WO | 2007/053564 A2 | 5/2007 | | |
| WO | WO 2007053564 A2 * | 5/2007 | | H04L 12/56 |

OTHER PUBLICATIONS

Chinese Office Action dated Jun. 16, 2014, issued in counterpart Chinese Application No. 201210117239.8, and English-language translation thereof.

* cited by examiner

INK, INK CARTRIDGE AND INK JET RECORDING METHOD

BACKGROUND OF THE INVENTION

1. Field of the Invention

The present invention relates to an ink suitable for ink jet, an ink cartridge using the ink and an ink jet recording method.

2. Description of the Related Art

The ink jet recording method enables recording on various type of recording medium. As attempts for more satisfactory image recording, various inks suitable for particular purposes have been proposed, such as inks suitable for recording images of photographic image quality on the recording medium such as glossy paper and inks suitable for recording documents on the recording medium such as plain paper. Recently, the ink jet recording method has been utilized for printing business texts including characters, tables, figures and the like, by using a recording medium such as plain paper; the frequency of use of the ink jet recording method in such uses has been dramatically increased. In such uses, from the viewpoint of economic efficiency, further improvement of color developability of the obtained images even with small application amounts of ink has been demanded.

Various investigations have also hitherto been made for the purpose of enhancing the color developability of the obtained images even with small application amounts of ink. For example, there is a proposal of an ink including a self-dispersible pigment capable of being dispersed in the ink without using a dispersant such as a water-soluble resin and a specific salt (see Japanese Patent Application Laid-Open No. 2001-081378). There is also a proposal of an ink including a self-dispersible pigment to the surface of the particle of which a functional group highly reactive with calcium is bonded (see Japanese Patent Application Laid-Open No. 2009-515007). Moreover, there is a proposal of an ink including a self-dispersible pigment, a poor medium and a good medium (see Japanese Patent Application Laid-Open No. 2006-045514). According to the statement in Japanese Patent Application Laid-Open No. 2006-045514, the dots formed by the ink are spread while the pigment is being aggregated, by using a poor solvent relatively high in permeability, and thus high color developability is obtained even when the ink droplets are small.

SUMMARY OF THE INVENTION

In the foregoing Japanese Patent Application Laid-Open No. 2001-081378, Japanese Patent Application Laid-Open No. 2009-515007 and Japanese Patent Application Laid-Open No. 2006-045514, investigations have been made mainly on black inks including self-dispersible carbon black; however, color inks are also required to be improved with respect to the color developability of the obtained images. Accordingly, the present inventors examined the degrees of color developability of the image obtained in the cases where color inks including organic pigments were used, and various types of plain papers were used as the recording medium, based on the techniques described in the foregoing Japanese Patent Application Laid-Open No. 2001-081378, Japanese Patent Application Laid-Open No. 2009-515007 and Japanese Patent Application Laid-Open No. 2006-045514. Consequently, the present inventors have found a significant difference between the carbon black used in the black ink and the organic pigments used in the color inks, with respect to the color developability of the obtained images. It has been found that even when a technique is effective in improving the color developability in the black ink, it is difficult to improve the color developability in the case where the technique is applied to the organic pigments. Moreover, it has been found that although a large application amount of ink facilitates obtaining a high color developability, when the application amount of ink is reduced, the color developability came down to a level lower than a level assumed from the application amount of ink, depending on the types of the plain papers used as the recording medium.

Accordingly, an object of the present invention is to provide an ink capable of obtaining images having high color developability independently of the type of the recording medium even when the application amount of the ink is small in an ink including an organic pigment. Another object of the present invention is to provide an ink cartridge and an ink jet recording method capable of stably obtaining images excellent in color developability by using the ink.

The objects are achieved by the present invention described below. Specifically, the ink according to the present invention is an ink including an organic pigment, a water-soluble resin and a surfactant, wherein the organic pigment contains a self-dispersible pigment to the surface of the particles of which a functional group at least containing a phosphonic acid group is bonded, the acid value of the water-soluble resin is 100 mg KOH/g or more and 160 mg KOH/g or less, the surfactant comprises an ethylene oxide adduct of a higher alcohol selected from the group consisting of a linear primary alcohol, a linear secondary alcohol and an isoalkyl alcohol, the HLB value of the surfactant as determined by the Griffin method is 13.0 or more, and the mass ratio of the content (% by mass) of the surfactant in the ink to the content (% by mass) of the waster-soluble resin in the ink is 0.07 or more and 0.70 or less.

According to the present invention, an organic-pigment-including ink capable of obtaining images having high color developability independently of the type of the recording medium even when the application amount of the ink is small can be provided. According to another embodiment of the present invention, the use of the ink enables the provision of an ink cartridge and an ink jet recording method capable of stably obtaining images excellent in color developability.

Further features of the present invention will become apparent from the following description of exemplary embodiments.

DESCRIPTION OF THE EMBODIMENTS

Hereinafter, the present invention will be described in detail with reference to preferred embodiments. Hereinafter, a functional group having a phosphonic acid group in the structure of the functional group is sometimes described as a "phosphonic acid type" and an organic pigment is sometimes described as "pigment". The values of the physical properties such as the viscosity, surface tension and pH in the present invention are the values at 25° C.

First, the details in reaching the present constitution are described. The present inventors examined the degrees of color developability of the image obtained in the cases where various types of plain papers were used as the recording medium, based on the techniques described in the foregoing Japanese Patent Application Laid-Open No. 2001-081378, Japanese Patent Application Laid-Open No. 2009-515007 and Japanese Patent Application Laid-Open No. 2006-045514. Consequently, it has been found that there is a significant difference between the carbon black used in the black ink and the organic pigments used in the color inks, with respect to the color developability of the obtained images.

This is interpreted to be ascribable to the below-described property difference between the carbon black and the organic pigment.

In the applications in which high color developability is important, as having hitherto been known, so-called high-structure carbon black is appropriate for black ink. This is because the higher is the structure, the bulkier is the carbon black particles, hence when the ink is applied to the recording medium, the collision frequency of the particles is increased and thus the aggregation of carbon black is promoted. In contrast to this, an organic pigment does not intrinsically form structure, and there is such a limitation that materials have to be selected under such a condition that "lowest-structure" carbon black is selected. Accordingly, when an organic pigment is used as a coloring material as in color ink, it is necessary to investigate the constitution of the ink from an approach different from an approach involving structure.

Under this premise, the present inventors applied to organic pigments the technique mainly applied to carbon black described in the foregoing Japanese Patent Application Laid-Open No. 2001-081378, Japanese Patent Application Laid-Open No. 2009-515007 and Japanese Patent Application Laid-Open No. 2006-045514, and examined the color developability of the obtained image. Consequently, it has been found that when the application amount of the ink is large, high color developability is obtained, but when the application amount of the ink is reduced, the color developability is more reduced than the level assumed from the application amount of the ink, depending on the type of the recording medium.

First, the present inventors compared the color developability of images for the case where the application amount of the ink was large. Thus, the present inventors have found that the color developability is enhanced when such an ink, as described in Japanese Patent Application Laid-Open No. 2009-515007, including a phosphonic acid-type self-dispersible pigment is used in various types of the recording medium. Moreover, it has also been found that higher color developability is obtained in the case where the phosphonic acid-type self-dispersible pigment is used, as compared to the cases where a carboxylic acid-type self-dispersible pigment and a sulfonic acid-type self-dispersible pigment are used. Based on these findings, the present inventors infer the relation between the type of the anionic group contained in the functional group of the self-dispersible pigment and the color developability of the image as follows.

The phosphonic acid group contained in the functional group bonded to the particle surface of the phosphonic acid-type self-dispersible pigment takes a dissociated form (anionic form) in the ink, and the electric double layer formed by the dissociated form stably maintains the dispersed state of the pigment. Plain paper commonly used as the recording medium contains as a loading material a salt typified by calcium salts. When an ink including a phosphonic acid-type self-dispersible pigment is applied to such a recording medium, the calcium salt is dissolved in the ink, the electrolyte (calcium ion) concentration in the concerned system is increased, consequently the electric double layer is compressed and the dispersed state of the pigment is destabilized. Further, the phosphonic acid group has such a specific property that two phosphonic acid groups and one cation can form a chelate structure. Accordingly, the self-dispersible pigment to the surface of the particles of which a functional group containing a phosphonic acid group is bonded forms a cross-linked structure between the pigment particles through the phosphonic acid group. It is supposed that a synergetic action of these characteristics results in an efficient aggregation of the pigment after the ink has been applied to the recording medium, and consequently high color developability is obtained.

However, as described above, even in the case where the ink including the phosphonic acid-type self-dispersible pigment was used, when the application amount of the ink was reduced, the color developability came down to a level lower than a level assumed from the application amount of the ink, depending on the type of the recording medium. Accordingly, the present inventors investigated various water-soluble organic solvents, various additives and others, for the purpose of improving the color developability of the image even in such a recording medium. Consequently, the present inventors have found that the inclusion of a specific water-soluble resin in the ink further enhances the color developability in the case where the application amount of the ink is increased, in such a recording medium as described below. Specifically, it has been found that a water-soluble resin having an acid value of 100 mg KOH/g or more and 160 mg KOH/g or less is appropriate. It has also been found that the recording medium capable of obtaining such an effect contain a calcium salt in a large amount.

When an ink is applied to a recording medium containing a calcium salt in a large amount, the calcium salt dissolves in the ink, and the electrolyte concentration in the concerned system is rapidly increased. Then, due to the aforementioned mechanism, the dispersed state of the phosphonic acid-type self-dispersible pigment is rapidly destabilized, and at the same time, the water-soluble resin is rapidly insolubilized to precipitate. It is supposed that in this way, large aggregates are formed by the self-dispersible pigment and the insolubilized resin, and such aggregates come to be efficiently present on the surface of the recording medium, and accordingly the color developability is enhanced.

In contrast to this, a resin having an acid value of less than 100 mg KOH/g is low in its water solubility and hence is present in the ink in the condition that the resin has a particle size (a dispersed state, namely, a state of an emulsion or a dispersion) instead of a dissolved state. In this case, even when the electrolyte concentration in the concerned system is high in the recording medium, the resin is originally in a phase separated state and is not newly precipitated, and hence no large aggregates are formed and the color developability is not enhanced. On the other hand, a resin having an acid value of more than 160 mg KOH/g is too high in its water solubility, and hence even when the electrolyte concentration in the concerned system is high in the recording system, the proportion of the resin maintaining the state of still being dissolved is large. Also, in this case, no large aggregates are formed and the color developability is not enhanced.

In a recording medium containing a small amount of a calcium salt, the improvement effect of the color developability due to the water-soluble resin was restrictive. This is conceivably because as is obvious from the aforementioned mechanism, the electrolyte concentration in the concerned system is not sufficiently increased even after the ink has been applied to the recording medium, and thus the insolubilization of the water-soluble resin tends to hardly occur.

It has also been found that even in the case where an ink including a phosphonic acid-type self-dispersible pigment and the water-soluble resin is used, when the application amount of the ink is reduced, the color developability still came down to a level lower than a level assumed from the application amount of the ink, depending on the type of the recording medium. Accordingly, the present inventors made detail analyses on the cause for the occurrence of such a situation and the obtained images. Consequently, the following facts have been revealed.

First, it has been found that the recording medium resulting in the aforementioned results contains the calcium salt in a large amount. The images recorded on such recording medium were coated with the coloring materials throughout the recording medium when the application amount of the ink was large; however, the images recorded on such recording medium included the areas coated with the coloring materials and the areas not coated with the coloring materials when the application amount of the ink was small. Further, it has been found that when the application amount of the ink is small, the areas coated with the coloring materials are high in color developability, but the areas coated with the coloring materials are small.

From the aforementioned fact, the present inventors have reached the recognition that the following two items are important for the purpose of enhancing the color developability of the image even when the application amount of the ink is small. Specifically, it is important that the color developability per one dot (hereinafter, sometimes referred to as dot color developability) be enhanced, and at the same time, the area occupied by a dot (hereinafter, sometimes referred to as dot area) be made large. In other words, it has been found that the following phenomenon leads to the fact that the aforementioned results were effectuated when a recording medium containing a calcium salt in a large amount was used. The large aggregates formed by the self-dispersible pigment and the insolubilized resin due to the aforementioned mechanism came to be efficiently present on the surface of the recording medium, and hence the dot color developability was enhanced. On other hand, the self-dispersible pigment and the water-soluble resin were strongly aggregated due to the same mechanism as aforementioned, and hence the ink spreading on the recording medium was suppressed to make the dot area small.

The images obtained by applying the techniques described in the foregoing Japanese Patent Application Laid-Open No. 2001-081378, Japanese Patent Application Laid-Open No. 2009-515007 and Japanese Patent Application Laid-Open No. 2006-045514 were exactly in such conditions as described above. In other words, it is inferred that the dot area was made small because in any cases where these techniques were used, the color developability of the image was enhanced through the promotion of the aggregation of the organic pigment. As described above, in the technique described in Japanese Patent Application Laid-Open No. 2006-045514, the dots formed by the ink are made large by using a poor medium relatively high in permeability. However, the dot area was able to be made large in the case where a carboxylic acid-type self-dispersible pigment was used by reference to the examples of Japanese Patent Application Laid-Open No. 2006-045514, but the dot color developability was insufficient. The dot area was made small in the case where a combination of the techniques described in Japanese Patent Application Laid-Open No. 2009-515007 and Japanese Patent Application Laid-Open No. 2006-0455514 was applied to an organic pigment, namely in the case of an ink in which a phosphonic acid-type self-dispersible pigment was used in place of a carboxylic acid-type self-dispersible pigment and a poor solvent relatively high in permeability was combined with this pigment.

The present inventors also made verification on a so-called resin-dispersed pigment dispersed by a water-soluble resin. When an ink including a resin-dispersed pigment was used, in a recording medium containing a calcium salt in a large amount, the dot color developability was high but the dot area was small, and the color developability in the case where the application amount of the ink was small was insufficient. It is supposed that this is because when the ink was applied to the recording medium and the electrolyte concentration in the concerned system was increased, the insolubilization of the water-soluble resin, which is a dispersant of the pigment, rapidly proceeded, hence the dispersed state of the pigment was rapidly destabilized, and thus large aggregates were formed. In a recording medium containing a calcium salt in a small amount, the color developability was lower irrespective of the application amount of the ink in the case where a resin-dispersed pigment was used as compared to the case where a self-dispersible pigment was used. It is supposed that this is because when the electrolyte concentration in the concerned system is not really increased after the ink has been applied to the recording medium, the dispersed state of the pigment tends to be maintained stably to some extent, due to the steric repulsion of the water-soluble resin, which is a dispersant of the pigment.

There appears to be a trade-off relation between the enhancement of the dot color developability based on the promotion of the pigment aggregation and the increase of the dot area based on the spreading of the ink in the recording medium. The present inventors made a further investigation, and have found a method for obtaining high color developability, by separately controlling these two phenomena, even when the application amount of the ink is small, independently of the type of the recording medium. Hereinafter, the details of the method are described.

First, the present inventors investigated the cause for the reduction of the dot area in the case where an image was recorded on a recording medium containing a calcium salt in a large amount by using an ink including a phosphonic acid-type self-dispersible pigment and the water-soluble resin. When the ink was applied to the recording medium, the electrolyte concentration in the concerned system was rapidly increased. Then, the water-soluble resin was rapidly insolubilized, and the dispersed state of the pigment was also destabilized, and thus large aggregates were formed. In this process, the ink was excessively thickened, and hence the ink did not spread and the dot area was small. Accordingly, the present inventors have formulated a hypothesis that the dot area can be made large by controlling the insolubilization of the water-soluble resin due to calcium ion, which is an electrolyte, to thereby suppress the excessive thickening of the ink in the recording medium. Thus, the present inventors investigated various materials for the purpose of enabling such control, and consequently, have reached a finding that specific nonionic surfactants are effective.

When a specific nonionic surfactant is added to an ink including a phosphonic acid-type self-dispersible pigment and the water-soluble resin, the surfactant is oriented on the water-soluble resin to increase the hydrophilicity of the water-soluble resin. When such an ink is applied to a recording medium containing a calcium salt in a large amount and the electrolyte concentration in the concerned system is increased, the destabilization of the dispersed state of the pigment and the insolubilization of the water-soluble resin occur. However, in this case, the surfactant is oriented on the water-soluble resin to increase the hydrophilicity of the water-soluble resin, and hence the formation of large aggregates is suppressed to result in the suppression of the excessive thickening of the ink. Thus, it is supposed that the dot area was able to be made small in conformity with the above formulated hypothesis. Although large aggregates are not formed between the pigment with its destabilized dispersed state and the water-soluble resin decreased in water solubility but increased in hydrophilicity due to the orientation of the surfactant, the mutual collision between the pigment and the water-soluble resin promotes the aggregation of the pigment. Consequently, it is supposed that the dot color developability was thus enhanced.

A consideration is made on the reason for the fact that the ink using the phosphonic acid-type self-dispersible pigment made the dot area small and the ink prepared by adding to this ink the water-soluble resin and the specific surfactant made the dot area large. Even when the water solubility of the water-soluble resin is decreased due to the increase of the electrolyte concentration in the concerned system after the ink has been applied to the recording medium, the surfactant is oriented on the water-soluble resin. Accordingly, the water-soluble resin creates a function as a spacer to suppress the aggregation of the pigment destabilized in its dispersed state, and this function suppresses the excessive thickening of the ink. Consequently, it is supposed that the dot area was thus made large.

The present inventors also made a verification on an ink including a resin-dispersed pigment and the nonionic surfactant with respect to the obtained image. In a recording medium containing a calcium salt in a large amount, the dot area was large but the dot color developability was low, and the color developability in the case where the application amount of the ink was small was insufficient. It is supposed that this is because the surfactant is oriented on the water-soluble resin, which is a dispersant of the pigment, to increase the hydrophilicity of the water-soluble resin, and hence, even when the ink is applied to the recording medium and the electrolyte concentration in the concerned system is increased, the dispersed state of the pigment is not so destabilized, and the aggregates are hardly formed. In the recording medium containing a calcium salt in a small amount, the color developability was reduced irrespective of the application amount of the ink in the case where a resin-dispersed pigment was used as compared to the case where a self-dispersible pigment was used.

The requirements imposed on the nonionic surfactant are described which are required for suppressing the excessive thickening of the ink and making the dot area large. According to the aforementioned mechanism, the structure of the surfactant hydrophobic moiety for interacting with the hydrophobic moiety of the water-soluble resin, and the hydrophilicity of the surfactant for controlling the insolubilization of the water-soluble resin are important. The present inventors investigated these factors in more detail, and have found out that the following requirements are necessary. The surfactant included in the ink is required to be an ethylene oxide adduct, having a HLB value determined by the Griffin method of 13.0 or more, of a higher alcohol selected from the group consisting of a linear primary alcohol, a linear secondary alcohol and an isoalkyl alcohol.

In contrast to this, in the case of a structure in which the alkyl chain, which is a hydrophobic moiety of the nonionic surfactant, is branched at a plurality of positions, because of the steric hindrance of the alkyl chain, the alkyl chain has a weak adsorbability to the hydrophobic moiety of the water-soluble resin. When an ethylene oxide adduct of a higher alcohol, having a HLB value of less than 13.0 is used, the water solubility of the nonionic surfactant is low and no sufficient hydrophilicity can be imparted to the water-soluble resin.

According to an investigation made by the present inventors, for the purpose of controlling the insolubilization of the water-soluble resin in the ink by the nonionic surfactant, the amount of the nonionic surfactant is required to be set at a certain ratio in relation to the amount of the water-soluble resin. Specifically, the mass ratio of the content (% by mass) of the surfactant in the ink to the content (% by mass) of the water-soluble resin in the ink is required to be 0.07 or more and 0.70 or less. When the mass ratio is less than 0.07, the hydrophilicity of the water-soluble resin cannot be enhanced and the dot area is reduced. On the other hand, when the mass ratio is more than 0.70, the hydrophilicity of the water-soluble resin is excessively enhanced, the insolubilization of the water-soluble resin is disturbed, the collision of the water-soluble resin with the pigment does not result in formation of large aggregates, and the dot color developability is reduced.

Ink

Hereinafter, the components included in the ink of the present invention are described.

Self-Dispersible Pigment

The coloring material included in the ink of the present invention is a self-dispersible pigment to the surface of the particles of which a functional group containing a phosphonic acid group is bonded. In other words, an organic pigment in which the functional group bonded to the surface of the particles of the organic pigment is a phosphonic acid group or an organic pigment in which the functional group contains other atomic groups and the phosphonic acid group is used. The type of the organic pigment usable in the present invention is not particularly limited; any heretofore known organic pigments can be used. Specific examples of such a pigment include organic pigments such as azo pigments, phthalocyanine pigments and quinacridone pigments. The content (% by mass) of a self-dispersible pigment in the ink is preferably 0.1% by mass or more and 10.0% by mass or less, more preferably 0.2% by mass or more and 10.0% by mass or less, and particularly preferably 2.0% by mass or more and 6.0% by mass or less, based on the total mass of the ink. The ink may include, in addition to the pigments, other coloring materials such as heretofore known dyes. In the present invention, within a range allowing the advantageous effects of the present invention to be obtained, other self-dispersible pigments and otherwise dispersed pigments (such as resin-dispersed pigments, microencapsulated pigments and resin-bonded self-dispersible pigments) may be further used in combination.

In the ink of the present invention, a water-soluble resin having an acid value of 100 mg KOH/g or more and 160 mg KOH/g or less is included. However, in the present invention, it is not expected to disperse the pigment only by the function of the water-soluble resin. In other words, the "self-dispersible" as referred to in the present invention does not fundamentally mean the dispersion of the pigment achieved only by the dispersing action of a polymer compound such as a resin, a compound having interfacial activity, or the like, wherein the polymer compound, a compound having interfacial activity, or the like is adsorbed on the surface of the pigment particles. Specifically, in contrast to the so-called resin-dispersed pigment which achieves the dispersion of the pigment only after the resin (dispersant) is adsorbed on the surface of the pigment particles, the self-dispersible pigment used in the present invention can be dispersed without using the specific water-soluble resin.

As described above, from the viewpoint of the color developability, in the self-dispersible pigment used in the present invention, it is required that at least a phosphonic acid group be contained in the functional group bonded to the surface of the pigment particles. The phosphonic acid group is represented by $-PO(OM)_2$, and in the ink, the phosphonic acid group may be either in a partially dissociated state or in a wholly dissociated state. In other words, the phosphonic acid group can take any form of —$PO_3H_2$ (acid form), —$PO_2H^-M^+$ (monobasic salt) and —$PO_2^{2-}$ $(M^+)_2$ (dibasic salt). In these formulae, M represents a hydrogen atom, an alkali metal, ammonium or an organic ammonium. Examples of the alkali metal ion include lithium ion, sodium ion and potassium ion; from the viewpoint of the color developability and the storage stability, potassium ion is particularly preferable. Between the surface of the pigment particles and the phosphonic acid group, an additional atomic group (—R—) may be present. Examples of the additional atomic group (—R—) include: a linear or branched alkylene group having 1 to 12 carbon atoms; arylene groups such as a phenylene group and a naphthylene group; an amide group; a sulfonyl group; an amino group; a carbonyl group; an ester group; and an ether group. Examples of the additional atomic group (—R—) also include the groups obtained by combining these groups.

In the present invention, the molecular weight of the functional group bonded to the surface of the pigment particles is preferably 300 or less. The functional group preferably contains —$C_6H_4$—CONH— (benzamide structure). The phosphorus atom of the phosphonic acid group is preferably bonded to a carbon atom (one of the carbon atoms contained on the surface of the pigment particle or contained in the additional atomic group), and this carbon atom is particularly preferably further bonded to a hydrogen atom, a nitrogen atom or a carbon atom.

The case where a hydroxy group is further bonded to the carbon atom to which the phosphorus atom is bonded is not really preferable because the color developability of the image is sometimes slightly reduced. This is due to the following reasons. In the functional group having the aforementioned structure, a hydroxy group is present in the immediate vicinity of the phosphonic acid group, and the hydroxy group increases the hydrophilicity of the pigment. This is because in such a pigment, even when the ink is applied to the recording medium and the electrolyte concentration in the concerned system is increased, the aggregation of the pigment due to the following two causes is made to hardly occur: one is the destabilization of the dispersed state of the pigment ascribable to the compression of the electric double layer of the pigment and the other is the formation of the cross-linked structure between the pigment particles through the phosphonic acid group.

As a result of the investigation made by the present inventors, it has been found that when the phosphonic acid-type self-dispersible pigment having a functional group possessing such a specific structure as described below is used, the functional group tends to be eliminated and the color developability of the image is sometimes slightly reduced, and consequently, when the phosphonic acid-type self-dispersible pigment having the specific structure is used, it is effective to add to the ink a salt having a structure similar to the functional group. Examples of such a self-dispersible pigment include a pigment to which abscess alendronic acid [phenyl ethyl sulfone ((4-amino-1-hydroxybutane-1,1-diyl) bisphosphonic acid)] is bonded, such as the self-dispersible pigment disclosed in Example 72 of Japanese Patent Application Laid-Open No. 2009-515007. When the ink including the pigment is stored over a long term, alendronic acid ((4-amino-1-hydroxybutane-1,1-diyl)bisphosphonic acid) tends to be eliminated, the promotion of the aggregation by the electrolyte is made to hardly occur, and hence the color developability of the image is sometimes slightly reduced. The elimination of alendronic acid is an equilibrium reaction, and hence it is preferable to add to the ink alendronic acid or a salt having a structure similar to the structure of alendronic acid.

The present inventors investigated various pigments different in surface charge amount from each other, and consequently have found that, as described below, there is a correlation between the surface charge amount of the self-dispersible pigment and the color developability of the image. Specifically, when the surface charge amount is too low, the number of the functional groups bonded to the surface of the pigment particles is small, and the proportion of the exposed surface area of the pigment particles is increased; the exposed surface area is high in hydrophobicity and the water-soluble resin tends to be adsorbed to the exposed area. Then, the dispersion of the pigment gets close to such a condition that the pigment is dispersed not only by the electric repulsion of the electric double layer due to the dissociated form of the phosphonic acid group but also by the steric repulsion of the water-soluble resin. Then, the dispersed state of the pigment tends to be maintained stably to some extent, and in the recording medium containing a calcium salt in a small amount, the effect of more improving the color developability of the image is sometimes hardly obtained. On the other hand, when the surface charge amount is too high, the amount of the phosphonic acid group possessed by the pigment is also large, and hence the formation of the cross-linked structure between the pigment particles through the phosphonic acid group is excessive, the ink applied to the recording medium tends to be thickened, and the dot area is sometimes slightly small. Accordingly, in the present invention, it is preferable to use a self-dispersible pigment having a surface charge amount of more than 1.5 $\mu mol/m^2$ and 8.0 $\mu mol/m^2$ or less, and it is more preferable to use a self-dispersible pigment having a surface charge amount of 1.6 $\mu mol/m^2$ or more and 8.0 $\mu mol/m^2$ or less.

In what has been described above, the surface charge amount of the self-dispersible pigment is measured by colloid titration. This method is simpler and higher in precision than a conventional method in which the anionic group amount is obtained by determining the counter ions of the anionic group, and has a merit that the amount of the anionic group can be directly measured. In below-described Examples, the surface charge amount of the pigment in the pigment dispersion liquid was measured by using an automatic potentiometric titrator (AT-510, manufactured by Kyoto Electronics Manufacturing Co., Ltd.) equipped with a streaming potential detection unit (PCD-500), based on colloid titration taking advantage of electric potential difference. In this case, methylglycol chitosan was used as the titration reagent. Of course, the surface charge amount can also be measured with the pigment extracted from the ink by an appropriate method.

The specific surface area of the self-dispersible pigment used in the present invention is preferably 50 $m^2/g$ or more and 140 $m^2/g$ or less. When the specific surface area is less than 50 $m^2/g$, the particle size of the pigment in a state of being dispersed in the ink tends to increase, and the sedimentation of the pigment or the like sometimes occurs during the storage of the ink. On the other hand, when the specific surface area is more than 140 $m^2/g$, in the case where the surface charge amount is set to fall within the aforementioned surface charge amount range, the surface charge amount per unit mass of the pigment is increased, and the electrolyte concentration in the ink becomes too high, and the storage stability of the ink is sometimes not sufficiently obtained.

Water-Soluble Resin

In the ink of the present invention, a water-soluble resin having an acid value of 100 mg KOH/g or more and 160 mg KOH/g or less is required to be included. As described above, the water-soluble resin is not used as a dispersant for the self-dispersible pigment. In the present invention, the statement that "a resin is water-soluble" means that when the water-soluble resin is neutralized with an alkali equivalent to the acid value of the water-soluble resin, the water-soluble resin does not make a particle that has a measurable particle size. In the present invention, a resin satisfying such a condition is describes as a water-soluble resin.

In the present invention, the mass ratio of the content (% by mass) of the surfactant in the ink to the content (% by mass) of the water-soluble resin in the ink is required to be 0.07 or more and 0.70 or less. The content (% by mass) of the water-soluble resin in the ink is preferably 1.0% by mass or more and 5.0% by mass or less and more preferably 1.0% by mass or more and 3.0% by mass or less, based on the total mass of the ink. When two or more water-soluble resins satisfying the requirements specified in the present invention are used, the aforementioned content of the water soluble resin is to be calculated as the total amount of the respective water-soluble resins used. The mass ratio of the content of the water-soluble resin in the ink to the content of the self-dispersible pigment in the ink is preferably set at 0.25 or more and 0.75 or less. In this case, the contents of the water-soluble resin and the self-dispersible pigment are the values based on the total mass of the ink.

As the water-soluble resin included in the ink, specifically a copolymer having as constitutional units at least such a hydrophilic unit and such a hydrophobic unit as presented below is preferable. In the following description, (meth)acryl means acryl and methacryl.

Examples of a monomer having a hydrophilic group which will become a hydrophilic unit by polymerization include the following: acidic monomers having a carboxy group such as (meth)acrylic acid, itaconic acid, maleic acid and fumaric acid, acidic monomers having a phosphonic acid group such as ethyl (meth)acrylate-2-phosphonate, anionic monomers such as anhydrides and salts of these acidic monomers; monomers having a hydroxy group such as 2-hydroxyethyl (meth)acrylate and 3-hydroxypropyl (meth)acrylate; and monomers having an ethylene oxide group such as methoxy (mono, di, tri, polyethylene glycol (meth)acrylate.

Examples of the cation forming a salt of the anionic monomer include ions of lithium, sodium, potassium, ammonium and organic ammonium. The water-soluble resin used in the present invention has an acid value, and hence the hydrophilic unit contains the units derived from the foregoing anionic monomers. The resin is preferably a resin having water solubility by being neutralized with a neutralizer such as the hydroxides of alkali metals (such as lithium, sodium and potassium) and aqueous ammonia. In the present invention, the unit derived from the anionic monomer is preferably of a potassium salt type because such unit can more increase the water solubility of the resin. When among the cations commonly used as a neutralizer of a resin, cations other than the cation of potassium is used, the water solubility of the water-soluble resin is sometimes relatively decreased. In such a case, when the ink is applied to a recording medium containing a calcium salt in a large amount, the water-soluble resin relatively tends to be aggregated, and hence the ink hardly spreads, and the dot area is sometimes slightly decreased.

Examples of a monomer having a hydrophobic group which will become a hydrophobic unit by polymerization include the following: monomers having an aromatic ring such as styrene, α-methylstyrene and benzyl (meth)acrylate; and monomers having an aliphatic group such as ethyl (meth)acrylate, methyl (meth)acrylate, (iso)propyl (meth)acrylate, (n-, iso-, t-)butyl (meth)acrylate and 2-ethylhexyl (meth) acrylate. In the present invention, it is preferable to use a water-soluble resin having at least a unit derived from a monomer possessing an aromatic ring. The surfactant tends to be adsorbed on such a water-soluble resin, and preferably increases the hydrophilicity of the water-soluble resin.

The weight average molecular weight of the water-soluble resin included in the ink of the present invention is preferably 5,000 or more and 20,000 or less. When the weight average molecular weight is less than 5,000, even in the case where the salt of calcium or the like contained in the recording medium is dissolved in the ink system, large aggregates are hardly formed after the ink has been applied to the recording medium, and no sufficient effect of improving the color developability is sometimes obtained. On the other hand, when the weight average molecular weight is more than 20,000, even before storing of the ink, the viscosity of the ink becomes too high, and not really preferably, the ink ejection stability is sometimes not obtained at a sufficiently high level.

Surfactant

The ink of the present invention is required to include as a surfactant an ethylene oxide adduct, having a HLB value of 13.0 or more, of a higher alcohol selected from the group consisting of a linear primary alcohol, a linear secondary alcohol and an isoalkyl alcohol. Preferable specific examples of the higher alcohol include: capryl alcohol, lauryl alcohol, secondary tridecyl alcohol, myristyl alcohol, cetyl alcohol, isocetyl alcohol, palmitoleyl alcohol, stearyl alcohol, isostearyl alcohol, oleyl alcohol, linoleyl alcohol and behenyl alcohol.

In the present invention, the number of the carbon atoms in the higher alcohol is preferably 12 or more and 22 or less. When the number of the carbon atoms is less than 12, the hydrophobicity of the surfactant is low, and unpreferably the interfacial activity becomes too low. On the other hand, when the number of the carbon atoms is more than 22, the hydrophobicity of the surfactant becomes too strong, and unpreferably the surfactant is sometimes hardly made to be stably present in the ink. Moreover, for the purpose of effectively orienting the surfactant on the surface of the pigment particles or on the water-soluble resin, the number of the carbon atoms of the higher alcohol is more preferably 16 or more. From what has been described above, the number of the carbon atoms of the higher alcohol is more preferably 16 or more and 22 or less. In the present invention, the number of the added ethylene oxide groups is preferably 10 or more and 50 or less and more preferably 10 or more and 30 or less.

In the present invention, the mass ratio of the content (% by mass) of the surfactant in the ink to the content (% by mass) of the water-soluble resin in the ink is required to be 0.07 or more and 0.70 or less. In the calculation of the mass ratio, the contents of the surfactant and the water-soluble resin are the values based on the total mass of the ink, and are the values not involving the substances not satisfying the requirements specified in the present invention. When a plurality of surfactants or a plurality of water-soluble resins satisfying the requirements specified in the present invention are present in the ink, the content of the surfactant or the water soluble resin is calculated as the total contents of the plurality of surfactants or water-soluble resins, respectively.

The content (% by mass) of the surfactant in the ink is preferably 0.10% by mass or more and 2.5% by mass or less and more preferably 0.30% by mass or more and 2.5% by mass or less, based on the total mass of the ink, although depending on the structure and the HLB value of the surfactant. When two or more surfactants satisfying the requirements specified in the present invention are used, the content of the surfactant is the value of the total contents of the two or more surfactants.

The ethylene oxide adduct of a higher alcohol included in the ink of the present invention is required to have a HLB value of 13.0 or more, as determined by the Griffin method. As described below, the upper limit of the HLB value is 20.0, and accordingly the upper limit of the HLB value of the ethylene oxide adduct of a higher alcohol usable in the present invention is also 20.0 or less.

Here, the Griffin method is described which is used in the present invention for the specification of the HLB value of the surfactant. The HLB value based on the Griffin method is derived from the formula weight of the hydrophilic group of the surfactant and the molecular weight of the surfactant, with the following equation (1), and indicates the degree of the hydrophilicity or the lipophilicity of the surfactant in a range from 0.0 to 20.0. The HLB value means that the lower the HLB value is, the higher the lipophilicity or hydrophobicity of the surfactant is, and conversely, the higher the HLB value is, the higher the hydrophilicity of the surfactant is.

HLB value=20×(Formula weight of hydrophilic group of surfactant)/(Molecular weight of surfactant)      Equation (1)

In the present invention, as long as the advantageous effects of the present invention are not disturbed, in addition to the specific surfactant, heretofore known surfactants commonly used in inks for ink jet, other than the specific surfactant, can be further included. Specific examples of such additional surfactants include the following surfactants other than the aforementioned surfactants: nonionic surfactants such as polyoxyethylene alkyl ether, acetylene glycol compounds and ethylene oxide adducts of acetylene glycol and polyoxyethylene/polyoxypropylene block copolymer; anionic surfactants; cationic surfactants; amphoteric surfactants such as betaine based compounds; and surfactants such as fluorine based compounds and silicone based compounds. The content (% by mass) of such an additional surfactant is preferably 0.1% by mass or more and 2.0% by mass or less and more preferably 0.3% by mass or more and 1.5% by mass or less, based on the total mass of the ink, although depending on the structure and the HLB value of the surfactant.

The surface tension of the ink of the present invention is preferably 38 mN/m or less. When the surface tension is more than 38 mN/m, the wettability of the ink to the recording medium is reduced, hence the ink hardly spreads on the recording medium, and the dot area is sometimes slightly small. The surface tension of the ink is also preferably 25 mN/m or more. When the surface tension is less than 25 mN/m, the ink tends to excessively penetrate into the recording medium, and sometimes the ink reaches the back side of the recording medium, leading to the occurrence of strike-through. The surface tension of the ink can be regulated by appropriately determining the type and the content of the water-soluble organic solvent or the surfactant. In the present invention, among the aforementioned additional surfactants, the ethylene oxide adduct of acetylene glycol is particularly preferably used for the purpose of regulating the surface tension of the ink so as to fall within an appropriate range. The surface tension of the ink as referred to herein means the static surface tension at 25° C. as measured by the platinum plate method.

The dynamic surface tension of the ink of the present invention at a lifetime of 50 msec is preferably less than 42 mN/m. Also in this case, the dot area can be made large, and even when the application amount of the ink is small, the color developability can be made high. The dynamic surface tension of the ink as referred to herein means the value at 25° C. as measured by the maximum bubble pressure method. In the maximum bubble pressure method, a probe (a capillary) is submerged in a liquid to be the measurement object, the maximum pressure required for an air bubble to be detached from the tip of the probe is measured, and thus the dynamic surface tension is determined. The "lifetime" means the time from the time when a fresh surface is formed after the detachment of an air bubble from the tip of the probe to the maximum bubble pressure time. The "maximum bubble pressure time" means the time when the radius of the curvature of the air bubble becomes equal to the radius of the tip of the probe.

Aqueous Medium

The ink of the present invention preferably includes as an aqueous medium water or a mixed solvent of water and a water-soluble organic solvent. As water, deionized water or ion-exchanged water is preferably used. In particular, the ink of the present invention is preferably prepared as an aqueous ink including at least water as the aqueous medium. The content (% by mass) of water in the ink is preferably 50.0% by mass or more and 95.0% by mass or less, based on the total mass of the ink. As the water-soluble organic solvent, any heretofore known water-soluble organic solvents having hitherto been commonly used, for example, in inks for ink jet can be used, and one or two or more water-soluble organic solvents can be used. Examples of the water-soluble organic solvent include: monohydric alcohols and polyhydric alcohols; alkylene glycols in which the number of the carbon atoms in the alkylene group is about 1 to 4; polyethylene glycols having an average molecular weight of 200 to 2,000; glycol ethers; and nitrogen-containing compounds. The content (% by mass) of the water-soluble organic solvent in the ink is preferably 3.0% by mass or more and 50.0% by mass or less, based on the total mass of the ink. When a water-soluble organic solvent represented by the below-described general formula (1) and a water-soluble organic solvent, high in permeability, for regulating the surface tension of the ink are used, the aforementioned content of the water-soluble organic solvent is a value including the contents of these solvents.

In the present invention, for the purpose of allowing the ink to be an ink having a static surface tension falling within the aforementioned preferable range, a water-soluble organic solvent high in permeability may be used. Examples of such a water-soluble organic solvent high in permeability include: 1,2-alkanediols having about 3 to 8 carbon atoms such as 1,2-pentanediol and 1,2-hexanediol; and glycol ethers such as diethylene glycol monobutyl ether and triethylene glycol monobutyl ether. When the surface tension of the ink is regulated with any one of the aforementioned additional surfactants, the concerned surfactant is oriented in the interface to develop the wettability of the ink, and hence it takes time from the application of the ink to the recording medium to the development of the wettability of the ink, although the time is very short. On the other hand, the use of these water-soluble organic solvents is more advantageous than the use of the aforementioned additional surfactants in that these water-soluble organic solvents can improve the wettability of the ink immediately after the application of the ink to the recording medium. Because of such a difference in the wettability development timing, particularly preferably the use of a water-soluble organic solvent high in permeability enables making the dot area larger, and enables more enhancement of the color developability even when the application amount of the ink is small. The content (% by mass) of the water-soluble organic solvent high in permeability in the ink is preferably 1.0% by mass or more and 10.0% by mass or less, based on the total mass of the ink.

As a result of the investigation made by the present inventors, the present inventors have found that further inclusion of a water-soluble organic solvent represented by the following general formula (1) in the ink of the present invention satisfying the above-described constitution enables the advantageous effects of the present invention to be obtained at a higher level. This is conceivably because the water-soluble organic solvent represented by the general formula (1) is high in affinity with the water-soluble resin and the surfactant in the ink, and accordingly, the presence of the water-soluble organic solvent represent by the general formula (1) relatively increases the mobility of the water-soluble resin and the surfactant, to facilitate the occurrence of a condition that the surfactant is oriented on the energetically more stable water-soluble resin.

General Formula (1)

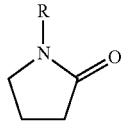

wherein in the general formula (1), R represents a hydrogen atom or a hydroxyalkyl group having 1 to 5 carbon atoms.

Examples of the water-soluble organic solvent represented by the general formula (1) include: 2-pyrrolidone in which R is a hydrogen atom; and N-(2-hydroxyethyl)-2-pyrrolidone in which R is $CH_2CH_2OH$. The content (% by mass) of the water-soluble organic solvent represented by the general formula (1) in the ink is preferably 1.0% by mass or more and 10.0% by mass or less, based on the total mass of the ink.

Other Components

The ink of the present invention may include, in addition to the aforementioned components, if necessary, organic compounds solid at ordinary temperature such as trimethylolethane, trimethylolpropane, urea and ethyleneurea. Also, in addition to the aforementioned components, if necessary, the ink of the present invention may include various additives such as a pH adjuster, a defoaming agent, an anti-rust agent, an antiseptic agent, an anti-mold agent, an antioxidant, a reduction inhibitor, an evaporation promoting agent and a chelating agent. The pH of the ink of the present invention is preferably 5 or more and 9 or less; a heretofore known pH adjuster commonly used in inks for ink jet may also be used in the ink of the present invention for the purpose of adjusting the pH thereof so as to fall within such a pH range.

Ink Cartridge

The ink cartridge of the present invention includes an ink and an ink storage portion for storing the ink, and the ink storage portion stores the above-described ink of the present invention. Examples of the structure of the ink cartridge include a structure in which the ink storage portion including an ink storing chamber for storing a liquid ink and a chamber housing a negative pressure generating member in the interior of which the ink is held with the aid of the negative pressure. The ink cartridge of the present invention may also be an ink cartridge including an ink storage portion having no ink storing chamber for storing a liquid ink but holding the total amount of the stored amount in the negative pressure generating member. Further, the ink cartridge of the present invention may also be an ink cartridge having a configuration including an ink storage portion and a recording head.

Ink Jet Recording Method

The ink jet recording method of the present invention is a method for recording an image on a recording medium by ejecting the above-described ink of the present invention with an ink jet recording head. Examples of the ink jet ejecting method include a method in which mechanical energy is applied to the ink and a method in which thermal energy is applied to the ink. In the present invention, it is particularly preferable to adopt an ink jet recording method utilizing thermal energy. Except for the use of the ink of the present invention, the steps of the ink jet recording method may be heretofore known steps.

In consideration of the above-described mechanism, it is more preferable to use the above-described ink of the present invention for the purpose of recording an image on a recording medium containing a calcium salt. Examples of such a recording medium include glossy paper and plain paper; however, it is particularly preferable to use plain paper among others. Of course, the recording medium usable in the ink jet recording method of the present invention is not limited to these.

EXAMPLES

Next, the present invention is described specifically with reference to Examples and Comparative Examples. However, the present invention is not limited thereto unless going beyond the gist of the present invention. In what follows, "parts" and "%" are based on the mass unless otherwise particularly specified, and various physical properties are the values measured at 25° C.

Preparation of Pigment Dispersion Liquid

Surface Charge Amount of Self-Dispersible Pigment

First, the method for measuring the surface charge amount of the self-dispersible pigment is described. The surface charge amount of the self-dispersible pigment in the pigment dispersion liquid was measured by the potentiometric titration using an automatic potentiometric titrator (AT-510, manufactured by Kyoto Electronics Manufacturing Co., Ltd.) equipped with a streaming potential detection unit (PCD-500) and methylglycol chitosan as the titration reagent.

Pigment Dispersion Liquid 1

A mixture was prepared by mixing 7.7 g of C.I. Pigment Red 122 (specific surface area: 140 $m^2/g$), 7 mmol of ((4-aminobenzoylamino)-methane-1,1-diyl)bisphosphonic acid monosodium salt, 20 mmol of nitric acid and 200 mL of purified water. The resulting mixture was mixed with a Silverson mixer at room temperature at 6,000 rpm. After 30 minutes, 20 mmol of sodium nitrite dissolved in a small amount of water was slowly added to this mixture. Due to this mixing, the temperature of the mixture reached 60° C., and the mixture was allowed to react for 1 hour in this condition. Then, by using an aqueous solution of sodium hydroxide, the pH of the mixture was adjusted to 10. After 30 minutes, 20 mL of purified water was added to the mixture, then the mixture was subjected to diafiltration with a spectrum membrane, then the sodium ions were replaced with potassium ions by ion exchange, and thus a dispersion liquid having content of a pigment of 10.0% was obtained. In this way, the pigment dispersion liquid 1 was obtained in which a self-dispersible pigment 1 was in a state of being dispersed in water wherein ((bezoylamino)-methane-1,1-diyl)bisphosphonic acid group having potassium ion as the counter ion was bonded to the surface of the pigment particles to form the self-dispersible pigment 1. The surface charge amount of the self-dispersible pigment 1 in the pigment dispersion liquid 1 was found to be 2.0 $\mu mol/m^2$.

Pigment Dispersion Liquid 2

The dispersion liquid 2 was obtained which had content of a pigment of 10.0% by the same procedure as for the pigment dispersion liquid 1 except that the replacement of the sodium ions with potassium ions was not performed in contrast to the preparation of the pigment dispersion liquid 1. In this way, the pigment dispersion liquid 2 was obtained in which a self-dispersible pigment 2 was in a state of being dispersed in water wherein ((bezoylamino)-methane-1,1-diyl)bisphosphonic acid group having a sodium ion as the counter ion was bonded to the surface of the pigment particles to form the self-dispersible pigment 2. The surface charge amount of the self-dispersible pigment 2 in the pigment dispersion liquid 2 was found to be 2.0 µmol/m$^2$.

Pigment Dispersion Liquid 3

The pigment dispersion liquid 3 was obtained which had content of a pigment of 10.0% by the same procedure as for the pigment dispersion liquid 1 except that the type and the amount of the pigment used in the preparation of the pigment dispersion liquid 1 were changed to 9.6 g of C.I. Pigment Blue 15:3 (specific surface area: 90 m$^2$/g). The surface charge amount of the self-dispersible pigment 3 in the pigment dispersion liquid 3 was found to be 1.6 µmol/m$^2$.

Pigment Dispersion Liquid 4

The pigment dispersion liquid 4 was obtained which had content of a pigment of 10.0% by the same procedure as for the pigment dispersion liquid 1 except that the type and the amount of the pigment used in the preparation of the pigment dispersion liquid 1 were changed to 9.6 g of C.I. Pigment Yellow 74 (specific surface area: 50 m$^2$/g). The surface charge amount of the self-dispersible pigment 4 in the pigment dispersion liquid 4 was found to be 1.6 µmol/m$^2$.

Pigment Dispersion Liquid 5

The pigment dispersion liquid 5 was obtained which had content of a pigment of 10.0% by the same procedure as for the pigment dispersion liquid 1 except that the amount of the pigment used in the preparation of the pigment dispersion liquid 1 was changed to 11.8 g. The surface charge amount of the self-dispersible pigment 5 in the pigment dispersion liquid 5 was found to be 1.3 µmol/m$^2$.

Pigment Dispersion Liquid 6

The pigment dispersion liquid 6 was obtained which had content of a pigment of 10.0% by the same procedure as for the pigment dispersion liquid 1 except that the amount of the pigment used in the preparation of the pigment dispersion liquid 1 was changed to 9.6 g. The surface charge amount of the self-dispersible pigment 6 in the pigment dispersion liquid 6 was found to be 1.6 µmol/m$^2$.

Pigment Dispersion Liquid 7

The pigment dispersion liquid 7 was obtained which had content of a pigment of 10.0% by the same procedure as for the pigment dispersion liquid 1 except that the amount of the pigment used in the preparation of the pigment dispersion liquid 1 was changed to 1.8 g. The surface charge amount of the self-dispersible pigment 7 in the pigment dispersion liquid 7 was found to be 8.0 µmol/m$^2$.

Pigment Dispersion Liquid 8

The pigment dispersion liquid 8 was obtained which had content of a pigment of 10.0% by the same procedure as for the pigment dispersion liquid 1 except that the amount of the pigment used in the preparation of the pigment dispersion liquid 1 was changed to 1.7 g. The surface charge amount of the self-dispersible pigment 8 in the pigment dispersion liquid 8 was found to be 8.2 µmol/m$^2$.

Pigment Dispersion Liquid 9

A mixture was prepared by mixing 250 g of C.I. Pigment Red 122 (specific surface area: 140 m$^2$/g), 1 L of deionized water and 750 mmol of aminophenyl-(2-sulfoethyl)sulfone (APSES). The resulting mixture was strongly stirred at a number of rotations of 300 rpm for ten minutes. Then, the mixture was heated to 60° C., and to this mixture, a 20% aqueous solution of sodium nitrite (1 equivalent based on the amount of APSES) was added over 15 minutes. Then, the mixture was allowed to react at 60° C. for 3 hours. The reaction product was taken out while the mixture was being diluted with 750 mL of deionized water, the dispersion liquid was purified by performing diafiltration with deionized water, and thus a dispersion liquid A having a content of the solid content of 20.0% was obtained. In a 2.5-L stainless steel beaker, 16.6 g of sodium alendronate (monosodium salt of (4-amino-1-hydroxybutane-1,1-diyl)bisphsphonic acid) and 66.39 g of deionized water were placed. To this beaker, 500 g of the dispersion liquid A having a content of the solid content of 20.0% was added, and the resulting mixture was vigorously stirred. Further, a 10% aqueous solution of sodium hydroxide was added under stirring to the mixture at a rate of 25 mL/min until the pH of the mixture became 12.7, then the mixture was stirred at 25° C. for 4 hours.

Subsequently, diafiltration was performed by using deionized water, further the sodium ions were replaced with potassium ions by ion exchange, and then water was added and the pigment was dispersed so as for content of the pigment to be 10.0% to prepare a dispersion liquid. In this way, the pigment dispersion liquid 9 was obtained in which a self-dispersible pigment 9 was in a state of being dispersed in water wherein a ((benzenesulfonylethylamino) 4-amino-1-hydrorxybutane-1,1-diyl)bisphosphonic acid group having potassium ion as the counter ion was bonded to the surface of the pigment particles to form the self-dispersible pigment 9. The surface charge amount of the self-dispersible pigment 9 in the pigment dispersion liquid 9 was found to be 2.0 µmol/m$^2$.

Pigment Dispersion Liquid 10

A mixture was prepared by mixing 5.5 g of C.I. Pigment Red 122 (specific surface area: 140 m$^2$/g) and 4.0 g of sulfanilic acid. Next, the vessel containing this mixture was placed in a water bath at 70° C., and under the condition that the mixture was strongly stirred, a solution prepared by dissolving 1.68 g of sodium nitrite in 74.32 g of water was added to the mixture. Then, the pH of the mixture was adjusted to 2 by using hydrochloric acid, and then while the temperature of the mixture was being maintained at 70° C., the mixture was strongly stirred for 1 hour. The thus obtained slurry was dried, and thus a pigment to the surface of the particles of which the —$C_6H_4SO_3Na$ group was bonded was prepared. Subsequently, the sodium ions were replaced with potassium ions by ion exchange, water was added to the resulting pigment to disperse the pigment so as for content of the pigment to be 10.0% and thus a dispersion liquid was prepared. In this way, the pigment dispersion liquid 10 was obtained in which a self-dispersible pigment 10 was in a state of being dispersed in water wherein the —$C_6H_4SO_3K$ group was bonded to the surface of the particles of the self-dispersible pigment 10. The surface charge amount of the self-dispersible pigment 10 in the pigment dispersion liquid 10 was found to be 2.0 µmol/m$^2$.

Pigment Dispersion Liquid 11

To a solution prepared by dissolving 9.7 g of concentrated hydrochloric acid in 20 g of water, 3.1 g of p-aminobenzoic acid was added under the condition that the solution was cooled to 5° C. Next, the vessel containing this solution was placed in an ice bath and the solution was stirred, and thus the solution was maintained constantly at 10° C. or lower. Under such a condition, to this solution, a solution prepared by dissolving 1.68 g of sodium nitrite in 35 g of water at 5° C. was added. The resulting solution was further stirred for 15 minutes, and 5.5 g of C.I. Pigment Red 122 (specific surface area: 140 m$^2$/g) was added to the solution under stirring. Then, the resulting solution was further stirred for 15 minutes. The obtained slurry was filtered with a filter paper (trade name: Standard Filter Paper No. 2, manufactured by Advantec Toyo Kaisha, Ltd.,), then the particles were sufficiently washed with water and dried in an oven set at 110° C. to prepare a pigment to the surface of the particles of which the —$C_6H_4$—COONa group was bonded. Subsequently, the sodium ions were replaced with potassium ions by ion exchange, water was added to the resulting pigment to disperse the pigment so as for content of the pigment to be 10.0% and thus a dispersion liquid was prepared. In this way, the pigment dispersion liquid 11 was obtained in which a self-dispersible pigment 11 was in a state of being dispersed in water wherein the —$C_6H_4COOK$ group was bonded to the surface of the particles of the self-dispersible pigment 11. The surface charge amount of the self-dispersible pigment 11 in the pigment dispersion liquid 11 was found to be 2.0 μmol/m$^2$.

Pigment Dispersion Liquid 12

In ion-exchanged water, 5.0 parts of styrene-n-butyl acrylate-acrylic acid copolymer (composition ratio (in moles) being 67:15:18), as the water soluble resin, was dissolved by using 1 neutralization equivalent of potassium hydroxide. The weight average molecular weight and the acid value of the water-soluble resin was 10,000 and 120 mg KOH/g, respectively. To the resulting aqueous solution, 10.0 g of C.I. Pigment Red 122 (specific surface area: 140 m$^2$/g) was added, and ion-exchanged water was further added so as for the total amount of ion-exchanged water to be 100.0 parts. The resulting mixture was subjected to dispersion operation for 3 hours with a batch-type vertical sand mill. The obtained dispersion liquid was subjected to centrifugal separation to remove coarse particles. Then, the dispersion liquid was pressure filtered with a microfilter of 3.0 μm pore size (manufactured by Fujifilm Corp.), ion-exchanged water was added to the resulting filtrate, and thus the pigment dispersion liquid 12 was obtained. The content of the pigment and the resin in the pigment dispersion liquid 12 were 10.0% and 5.0%, respectively.

Synthesis of Water-Soluble Resins

By using the monomers (unit: parts) shown in the upper section of Table 1, the water-soluble resins 1 to 8 were synthesized. The anionic groups in the water-soluble resins were all neutralized by using a 10.0% aqueous solution of potassium hydroxide for the water-soluble resins 1 to 5, 7 and 8 and by using a 10.0% aqueous solution of sodium hydroxide for the water-soluble resin 6. Then, by adding appropriate amounts of ion-exchanged water, the resin aqueous solutions 1 to 8 each having a content of the water-soluble resin (solid content) of 20.0% were prepared. In the lower section of Table 1, the properties of the water-soluble resins are shown.

TABLE 1

The compositions and the properties of the water-soluble resins

| | | Water-soluble resin No. | | | | | | | |
|---|---|---|---|---|---|---|---|---|---|
| | | 1 | 2 | 3 | 4 | 5 | 6 | 7 | 8 |
| Monomers used for synthesis | Styrene | 69 | 66 | 69 | 72 | 64 | 69 | 73 | 63 |
| | Butyl acrylate | 15 | 15 | | 15 | 15 | 15 | 15 | 15 |
| | Benzyl methacrylate | | | 15 | | | | | |
| | Acrylic acid | 16 | | 16 | 13 | 21 | 16 | 12 | 22 |
| | Methacrylic acid | | 19 | | | | | | |
| Properties | Acid value [mgKOH/g] | 120 | 120 | 120 | 100 | 160 | 120 | 90 | 170 |
| | Weight-average molecular weight | 10,000 | 10,000 | 10,000 | 10,000 | 10,000 | 10,000 | 10,000 | 10,000 |
| | Counter ion of anionic group | K | K | K | K | K | Na | K | K |

Structure and Physical Properties of Surfactants

Table 2 shows the structure and HLB values of surfactants, which are nonionic surfactants, and also the general formulae and the numbers of carbon atoms of higher alcohols and the numbers of moles of the polyoxyethylene chains when such surfactants correspond to the details specified in the present invention. The HLB values are the values obtained by the Griffin method and derived based on the foregoing equation (1). In Table 2, NIKKOL BC-20, BT-12, BL-21, BC-150 and BC-10 (trade names) are the surfactants manufactured by Nikko Chemicals Co., Ltd.; EMALEX 512, 1825 and 112, and BHA-20 and 2425 and CS-30 (trade names) are the surfactants manufactured by Nihon-Emulsion Co., Ltd.; ACETYLENOL E100 (trade name) is the surfactant manufactured by Kawaken Fine Chemicals Co., Ltd.

TABLE 2

Structure and physical properties of surfactants

| | Structure | HLB value | Higher alcohol General formula | Number of carbon atoms | Number of attached ethylene oxide groups |
|---|---|---|---|---|---|
| NIKKOL BC-20 | Polyoxyethylene cetyl ether | 15.7 | $C_{16}H_{33}OH$ | 16 | 20 |

TABLE 2-continued

Structure and physical properties of surfactants

| | Structure | HLB value | Higher alcohol General formula | Number of carbon atoms | Number of attached ethylene oxide groups |
|---|---|---|---|---|---|
| EMALEX 512 | Polyoxyethylene oleyl ether | 13.3 | $C_{18}H_{35}OH$ | 18 | 12 |
| EMALEX 1825 | Polyoxyethylene isostearyl ether | 16.1 | $C_9H_{19}CH(C_7H_{15})CH_2OH$ | 18 | 25 |
| NIKKOL BT-12 | Polyoxyethylene secondary-tridecyl ether | 14.5 | $C_6H_{13}CH(C_6H_{13})OH$ | 13 | 12 |
| NIKKOL BL-21 | Polyoxyethylene lauryl ether | 16.6 | $C_{12}H_{25}OH$ | 12 | 21 |
| EMALEX 112 | Polyoxyethylene cetyl ether | 13.7 | $C_{16}H_{33}OH$ | 16 | 12 |
| NIKKOL BC-150 | Polyoxyethylene cetyl ether | 19.3 | $C_{16}H_{33}OH$ | 16 | 150 |
| EMALEX BHA-20 | Polyoxyethylene behenyl ether | 14.6 | $C_{22}H_{45}OH$ | 22 | 20 |
| EMALEX 2425 | Polyoxyethylene decyltetradecyl ether | 15.1 | $C_{12}H_{25}CH(C_{10}H_{21})CH_2OH$ | 24 | 25 |
| EMALEX CS-30 | Polyoxyethylene cholesteryl ether | 14.0 | — | 25 | 30 |
| NIKKOL BC-10 | Polyoxyethylene cetyl ether | 12.9 | $C_{16}H_{33}OH$ | 16 | 10 |
| ACETYLENOL E100 | Ethylene oxide adduct of acetylene glycol | 13.3 | — | 14 | 10 |

Preparation of Ink

The components (unit: %) shown in the upper section of Table 3 were mixed, and sufficiently stirred, and then the resulting mixtures were pressure filtered with a microfilter of 1.0 μm pore size (Manufactured by Fujifilm Corp.) to prepare the inks. A polyethylene glycol having an average molecular weight of 600 was used, and as the alendronic acid salt, potassium (1-hydroxybutane-1,1-diyl)bis(phopsphonate) was used. In Example 16, EMALEX 2425 was sparingly dissolved in water, and hence the ink of Example 16 was prepared with a stirring time four times the stirring times in preparation of other inks. The lower section of Table 3 shows, for each of the inks, content of pigment [%], content of water-soluble resin [%], content of the surfactant satisfying the requirements specified in the present invention [%], and the mass ratio of the surfactant content/the water soluble resin content. For each of the obtained inks, the surface tension was measured with an automatic surface tensiometer (CBVP-Z type, manufactured by Kyowa Interface Science Co., Ltd.) by a platinum plate method; the surface tension of the ink of Example 25 was more than 38 mN/m, and the surface tension of each of the other inks was less than 38 mN/m.

TABLE 3

Compositions and properties of inks

| | Examples | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Pigment dispersion liquid 1 | 50.0 | | | | 50.0 | 50.0 | 50.0 | 50.0 | 50.0 | 50.0 | 50.0 | 50.0 | 50.0 | 50.0 | 50.0 | 50.0 |
| Pigment dispersion liquid 2 | | 50.0 | | | | | | | | | | | | | | |
| Pigment dispersion liquid 3 | | | 30.0 | | | | | | | | | | | | | |
| Pigment dispersion liquid 4 | | | | 30.0 | | | | | | | | | | | | |
| Pigment dispersion liquid 5 | | | | | | | | | | | | | | | | |
| Pigment dispersion liquid 6 | | | | | | | | | | | | | | | | |
| Pigment dispersion liquid 7 | | | | | | | | | | | | | | | | |
| Pigment dispersion | | | | | | | | | | | | | | | | |

TABLE 3-continued

| Compositions and properties of inks | | | | | | | | | | | | | | | | |
|---|---|---|---|---|---|---|---|---|---|---|---|---|---|---|---|---|
| liquid 8 | | | | | | | | | | | | | | | | |
| Pigment dispersion liquid 9 | | | | | | | | | | | | | | | | |
| Pigment dispersion liquid 10 | | | | | | | | | | | | | | | | |
| Pigment dispersion liquid 11 | | | | | | | | | | | | | | | | |
| Pigment dispersion liquid 12 | | | | | | | | | | | | | | | | |
| Resin aqueous solution 1 | 12.5 | 12.5 | 7.5 | 7.5 | | | | | 12.5 | 12.5 | 12.5 | 12.5 | 12.5 | 12.5 | 12.5 | 12.5 |
| Resin aqueous solution 2 | | | | | 12.5 | | | | | | | | | | | |
| Resin aqueous solution 3 | | | | | | 12.5 | | | | | | | | | | |
| Resin aqueous solution 4 | | | | | | | 12.5 | | | | | | | | | |
| Resin aqueous solution 5 | | | | | | | | 12.5 | | | | | | | | |
| Resin aqueous solution 6 | | | | | | | | | | | | | | | | |
| Resin aqueous solution 7 | | | | | | | | | | | | | | | | |
| Resin aqueous solution 8 | | | | | | | | | | | | | | | | |
| NIKKOL BC-20 | 0.5 | 0.5 | 0.5 | 0.5 | 0.5 | 0.5 | 0.5 | 0.5 | | | | | | | | |
| EMALEX 512 | | | | | | | | | 0.5 | | | | | | | |
| EMALEX 1825 | | | | | | | | | | 0.5 | | | | | | |
| NIKKOL BT-12 | | | | | | | | | | | 0.5 | | | | | |
| NIKKOL BL-21 | | | | | | | | | | | | 0.5 | | | | |
| EMALEX 112 | | | | | | | | | | | | | 0.5 | | | |
| NIKKOL BC-150 | | | | | | | | | | | | | | 0.5 | | |
| EMALEX BHA-20 | | | | | | | | | | | | | | | 0.5 | |
| EMALEX 2425 | | | | | | | | | | | | | | | | 0.5 |
| EMALEX CS-30 | | | | | | | | | | | | | | | | |
| NIKKOL BC-10 | | | | | | | | | | | | | | | | |
| ACETYLENOL E100 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| Alendronic acid salt | | | | | | | | | | | | | | | | |
| Glycerin | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| Polyethylene glycol | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| 2-Pyrrolidone | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | |
| N-(2-hydroxyethyl)-2-pyrrolidone | | | | | | | | | | | | | | | | |
| 1,2-Hexanediol | | | | | | | | | | | | | | | | |
| Diethylene glycol monobutyl ether | | | | | | | | | | | | | | | | |
| Triethylene glycol | | | | | | | | | | | | | | | | |

TABLE 3-continued

| Compositions and properties of inks |
|---|

| | | | | | | | | | | | | | | | | |
|---|---|---|---|---|---|---|---|---|---|---|---|---|---|---|---|---|
| monobutyl ether | | | | | | | | | | | | | | | | |
| Water | 25.2 | 25.2 | 50.2 | 50.2 | 25.2 | 25.2 | 25.2 | 25.2 | 25.2 | 25.2 | 25.2 | 25.2 | 25.2 | 25.2 | 25.2 | 25.2 |
| Content of pigment [%] | 5.0 | 5.0 | 3.0 | 3.0 | 5.0 | 5.0 | 5.0 | 5.0 | 5.0 | 5.0 | 5.0 | 5.0 | 5.0 | 5.0 | 5.0 | 5.0 |
| Content of water-soluble resin [%] | 2.5 | 2.5 | 1.5 | 1.5 | 2.5 | 2.5 | 2.5 | 2.5 | 2.5 | 2.5 | 2.5 | 2.5 | 2.5 | 2.5 | 2.5 | 2.5 |
| Content of surfactant [%] | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Surfactant/Water-soluble resin | 0.20 | 0.20 | 0.33 | 0.33 | 0.20 | 0.20 | 0.20 | 0.20 | 0.20 | 0.20 | 0.20 | 0.20 | 0.20 | 0.20 | 0.20 | 0.20 |

| | Examples | | | | | | | | | | | | | | | |
|---|---|---|---|---|---|---|---|---|---|---|---|---|---|---|---|---|
| | 17 | 18 | 19 | 20 | 21 | 22 | 23 | 24 | 25 | 26 | 27 | 28 | 29 | 30 | 31 | 32 |
| Pigment dispersion liquid 1 | 50.0 | 50.0 | | | | | 50.0 | 50.0 | 50.0 | 50.0 | 50.0 | 50.0 | | | 50.0 | |
| Pigment dispersion liquid 2 | | | | | | | | | | | | | | | | |
| Pigment dispersion liquid 3 | | | | | | | | | | | | | | | | |
| Pigment dispersion liquid 4 | | | | | | | | | | | | | | | | |
| Pigment dispersion liquid 5 | | | 50.0 | | | | | | | | | | | | | 50.0 |
| Pigment dispersion liquid 6 | | | | 50.0 | | | | | | | | | | | | |
| Pigment dispersion liquid 7 | | | | | 50.0 | | | | | | | | | | | |
| Pigment dispersion liquid 8 | | | | | | 50.0 | | | | | | | | | | |
| Pigment dispersion liquid 9 | | | | | | | | | | | | | | | | |
| Pigment dispersion liquid 10 | | | | | | | | | | | | | 50.0 | 50.0 | | |
| Pigment dispersion liquid 11 | | | | | | | | | | | | | | | | |
| Pigment dispersion liquid 12 | | | | | | | | | | | | | | | | |
| Resin aqueous solution 1 | 12.5 | 12.5 | 12.5 | 12.5 | 12.5 | 12.5 | 12.5 | 12.5 | 12.5 | 12.5 | 12.5 | 12.5 | 12.5 | 12.5 | | 12.5 |
| Resin aqueous solution 2 | | | | | | | | | | | | | | | | |
| Resin aqueous solution 3 | | | | | | | | | | | | | | | | |
| Resin aqueous solution 4 | | | | | | | | | | | | | | | | |
| Resin aqueous solution 5 | | | | | | | | | | | | | | | | |
| Resin aqueous solution 6 | | | | | | | | | | | | | | | | 12.5 |
| Resin aqueous solution 7 | | | | | | | | | | | | | | | | |
| Resin | | | | | | | | | | | | | | | | |

TABLE 3-continued

Compositions and properties of inks

| | | | | | | | | | | | | | | | | |
|---|---|---|---|---|---|---|---|---|---|---|---|---|---|---|---|---|
| aqueous solution 8 | | | | | | | | | | | | | | | | |
| NIKKOL BC-20 | 0.175 | 1.75 | 0.5 | 0.5 | 0.5 | 0.5 | 0.5 | 0.5 | 0.2 | 0.5 | 0.5 | 0.5 | 0.5 | 0.5 | 0.5 | |
| EMALEX 512 | | | | | | | | | | | | | | | | |
| EMALEX 1825 | | | | | | | | | | | | | | | | |
| NIKKOL BT-12 | | | | | | | | | | | | | | | | 0.5 |
| NIKKOL BL-21 | | | | | | | | | | | | | | | | |
| EMALEX 112 | | | | | | | | | | | | | | | | |
| NIKKOL BC-150 | | | | | | | | | | | | | | | | |
| EMALEX BHA-20 | | | | | | | | | | | | | | | | |
| EMALEX 2425 | | | | | | | | | | | | | | | | |
| EMALEX CS-30 | | | | | | | | | | | | | | | | |
| NIKKOL BC-10 | | | | | | | | | | | | | | | | |
| ACETYLENOL E100 | 0.8 | 0.8 | 0.8 | 0.8 | 0.8 | 0.8 | 0.8 | 0.8 | | 0.5 | 0.5 | 0.5 | 0.8 | 0.8 | 0.8 | 0.8 |
| Alendronic acid salt | | | | | | | | | | | | | | 0.05 | | |
| Glycerin | 5.0 | 5.0 | 5.0 | 5.0 | 5.0 | 5.0 | 5.0 | 10.0 | 5.0 | 5.0 | 5.0 | 5.0 | 5.0 | 5.0 | 5.0 | 7.5 |
| Polyethylene glycol | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| 2-Pyrrolidone | 5.0 | 5.0 | 5.0 | 5.0 | 5.0 | 5.0 | | 5.0 | 5.0 | 5.0 | 5.0 | 5.0 | 5.0 | 5.0 | 5.0 | |
| N-(2-hydroxyethyl)-2-pyrrolidone | | | | | | | 5.0 | | | | | | | | | |
| 1,2-Hexanediol | | | | | | | | | 2.0 | | | | | | | |
| Diethylene glycol monobutyl ether | | | | | | | | | | 2.0 | | | | | | |
| Triethylene glycol monobutyl ether | | | | | | | | | | | 2.0 | | | | | |
| Water | 25.525 | 23.95 | 25.2 | 25.2 | 25.2 | 25.2 | 25.2 | 25.2 | 26.3 | 23.5 | 23.5 | 23.5 | 25.2 | 25.15 | 25.2 | 27.7 |
| Content of pigment [%] | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| Content of water-soluble resin [%] | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| Content of surfactant [%] | 0.175 | 1.75 | 0.5 | 0.5 | 0.5 | 0.5 | 0.5 | 0.5 | 0.2 | 0.5 | 0.5 | 0.5 | 0.5 | 0.5 | 0.5 | 0.5 |
| Surfactant/Water-soluble resin | 0.07 | 0.70 | 0.20 | 0.20 | 0.20 | 0.20 | 0.20 | 0.20 | 0.08 | 0.20 | 0.20 | 0.20 | 0.20 | 0.20 | 0.20 | 0.20 |

| | Comparative Examples | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Pigment dispersion liquid 1 | | | | 50.0 | 50.0 | 50.0 | 50.0 | 50.0 | 50.0 | 50.0 | 50.0 | 50.0 | | | |
| Pigment dispersion liquid 2 | | | | | | | | | | | | | | | |
| Pigment dispersion liquid 3 | | | | | | | | | | | | | | | |
| Pigment dispersion liquid 4 | | | | | | | | | | | | | | | |
| Pigment dispersion liquid 5 | | | | | | | | | | | | | | | |

TABLE 3-continued

Compositions and properties of inks

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Pigment dispersion liquid 6 | | | | | | | | | | | | | | | |
| Pigment dispersion liquid 7 | | | | | | | | | | | | | | | |
| Pigment dispersion liquid 8 | | | | | | | | | | | | | | | |
| Pigment dispersion liquid 9 | | | | | | | | | | | | | | | |
| Pigment dispersion liquid 10 | 50.0 | | | | | | | | | | | | 50.0 | | |
| Pigment dispersion liquid 11 | | 50.0 | | | | | | | | | | | | 50.0 | |
| Pigment dispersion liquid 12 | | | 50.0 | | | | | | | | | | | | 50.0 |
| Resin aqueous solution 1 | 12.5 | 12.5 | | | | 12.5 | 12.5 | 12.5 | 12.5 | 12.5 | | | | | |
| Resin aqueous solution 2 | | | | | | | | | | | | | | | |
| Resin aqueous solution 3 | | | | | | | | | | | | | | | |
| Resin aqueous solution 4 | | | | | | | | | | | | | | | |
| Resin aqueous solution 5 | | | | | | | | | | | | | | | |
| Resin aqueous solution 6 | | | | | | | | | | | | | | | |
| Resin aqueous solution 7 | | | | 12.5 | | | | | | | | | | | |
| Resin aqueous solution 8 | | | | | 12.5 | | | | | | | | | | |
| NIKKOL BC-20 | 0.5 | 0.5 | 0.5 | 0.5 | 0.5 | 0.5 | | | | 0.15 | 2.0 | | | | |
| EMALEX 512 | | | | | | | | | | | | | | | |
| EMALEX 1825 | | | | | | | | | | | | | | | |
| NIKKOL BT-12 | | | | | | | | | | | | | | | |
| NIKKOL BL-21 | | | | | | | | | | | | | | | |
| EMALEX 112 | | | | | | | | | | | | | | | |
| NIKKOL BC-150 | | | | | | | | | | | | | | | |
| EMALEX BHA-20 | | | | | | | | | | | | | | | |
| EMALEX 2425 | | | | | | | | | | | | | | | |
| EMALEX CS-30 | | | | | | | | | | 0.5 | | | | | |
| NIKKOL BC-10 | | | | | | | | | | | 0.5 | | | | |
| ACETYLENOL E100 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| Alendronic acid salt | | | | | | | | | | | | | | | |
| Glycerin | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| Polyethylene glycol | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| 2-Pyrrolidone | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| N-(2-hydroxyethyl)-2-pyrrolidone | | | | | | | | | | | | | | | |

TABLE 3-continued

Compositions and properties of inks

| | | | | | | | | | | | | | | | |
|---|---|---|---|---|---|---|---|---|---|---|---|---|---|---|---|
| 1,2-Hexanediol | | | | | | | | | | | | | | | |
| Diethylene glycol monobutyl ether | | | | | | | | | | | | | | | |
| Triethylene glycol monobutyl ether | | | | | | | | | | | | | | | |
| Water | 25.2 | 25.2 | 37.7 | 37.7 | 25.2 | 25.2 | 25.7 | 25.2 | 25.2 | 25.55 | 23.7 | 38.2 | 38.2 | 38.2 | 38.2 |
| Content of pigment [%] | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| Content of water-soluble resin [%] | 2.5 | 2.5 | 3.0 | 0.0 | 2.5 | 2.5 | 2.5 | 2.5 | 2.5 | 2.5 | 2.5 | 0.0 | 0.0 | 0.0 | 3.0 |
| Content of surfactant [%] | 0.5 | 0.5 | 0.5 | 0.5 | 0.5 | 0.5 | 0.0 | 0.0 | 0.0 | 0.15 | 2.0 | 0.0 | 0.0 | 0.0 | 0.0 |
| Surfactant/Water-soluble resin | 0.20 | 0.20 | 0.17 | — | 0.20 | 0.20 | 0.00 | 0.00 | 0.00 | 0.06 | 0.80 | — | — | — | 0.00 |

Evaluations

For recording images, there was used an ink jet recording apparatus modified from an ink jet recording apparatus (trade name: PIXUS iP4100, manufactured by Canon Inc.) equipped with a recording head ejecting ink by the action of thermal energy. Each of the inks obtained as described above was filled into an ink cartridge, and the cartridge was set at the position of yellow ink. The recording conditions were such that the image as wide as the disposition width of the ejection orifice of the recording head was recorded only by a one-pass single direction recording in which the scanning started from the home position of the recording head. In Examples, a unit of 1/600 inch×1/600 inch was defined as one pixel. The application amount of the ink to the recording medium was set at 8 ng/pixel under a condition 1 (a case where the application amount of the ink was small) and 20 ng/pixel under a condition 2 (a case where the application amount of the ink was large). On the below-described three types of recording medium (plain paper), a 1 inch×1 inch area of solid image was recorded under each of the conditions 1 and 2. As the recording medium, PB PAPER GF-500 (manufactured by Canon Inc.); and HP All purpose Paper and HP Bright White Inkjet Paper (manufactured by Hewlett-Packard Co.) were used. Among them, GF-500 has a small calcium content, and HP All purpose Paper and HP Bright White Inkjet Paper each have a large calcium content. The recorded products obtained as described above were dried at 23° C. and a relative humidity of 55% for 24 hours, and the optical density of each of the solid images was measured with a spectrophotometer (trade name: Spectrolino, manufactured by Gretag-Macbeth AG) under the conditions that the light source was D50 and the visual angle was 2°.

Evaluation of Color Developability in the Case of Small Application Amount of Ink Evaluation of the color developability in the case of a small application amount of ink was performed from the lowest value of the optical densities of the images based on the small application amount of the ink (the image of the condition 1) in the three types of recording medium. Based on this evaluation, the degree of the color developability of image obtained in the case of the small application amount of ink can be known. Specifically, it is meant that the higher is the lowest value of the optical density, the more excellent is the color developability. The evaluation criteria are as follows. In the present invention, in terms of the following evaluation criteria A, B and C, the level of A and B was determined as acceptable and the level of C was determined as unacceptable. The evaluation results are shown in Table 4.

A: The lowest value of the optical density was 0.90 or more.
B: The lowest value of the optical density was 0.85 or more and less than 0.90.
C: The lowest value of the optical density was less than 0.85.

Evaluation of Ratio of Color Developability in the Case of Small Application Amount of Ink to Color Developability in the Case of Large Application Amount of Ink The ratios of the optical densities of the images based on a small application amount of the ink (the image of the condition 1) to the optical densities of the images based on a large application amount of the ink (the image of the condition 2), namely, the values of (optical density of image of condition 1)/(optical density of image of condition 2) in the three types of recording medium were obtained. From the lowest value of the values obtained for the three types of recording medium, the ratio of the case of the small application amount of the ink to the case of the large application amount of the ink was evaluated. Based on this evaluation, it can be known to what degree the color developability obtained in the case of the small application amount of the ink was decreased as compared to the level assumed from the application amount of the ink. Specifically, it is meant that the higher is the lowest value of the ratio of the optical density, the more excellent color developability close to the level assumed from the application amount of the ink can be obtained even in the case where the application amount of the ink is small. The evaluation criteria are as follows. In the present invention, in terms of the following evaluation criteria A, B and C, the level of A and B was determined as acceptable and the level of C was determined as unacceptable. The evaluation results are shown in Table 4.

A: The lowest value of the ratio of the optical density was 0.85 or more.
B: The lowest value of the ratio of the optical density was 0.80 or more and less than 0.85.
C: The lowest value of the ratio of the optical density was less than 0.80.

TABLE 4

| | | Color developability | Ratio of color developability |
|---|---|---|---|
| Example | 1 | A | A |
| | 2 | A | A |
| | 3 | A | A |
| | 4 | A | A |
| | 5 | A | A |
| | 6 | A | A |
| | 7 | A | A |
| | 8 | A | A |
| | 9 | A | A |
| | 10 | A | A |
| | 11 | A | B |
| | 12 | A | B |
| | 13 | A | A |
| | 14 | A | A |
| | 15 | A | A |
| | 16 | A | A |
| | 17 | A | A |
| | 18 | A | A |
| | 19 | B | A |
| | 20 | A | A |
| | 21 | A | A |
| | 22 | A | A |
| | 23 | A | A |
| | 24 | A | B |
| | 25 | A | B |
| | 26 | A | A |
| | 27 | A | A |
| | 28 | A | A |
| | 29 | B | A |
| | 30 | A | A |
| | 31 | A | B |
| | 32 | B | B |
| Comparative Example | 1 | C | A |
| | 2 | C | A |
| | 3 | C | A |
| | 4 | A | C |
| | 5 | A | C |
| | 6 | C | A |
| | 7 | A | C |
| | 8 | A | C |
| | 9 | A | C |
| | 10 | A | C |
| | 11 | C | A |
| | 12 | A | C |
| | 13 | C | A |
| | 14 | C | A |
| | 15 | C | C |

As compared to the ink of Example 21, the ink of Example 22 had a high surface charge density of the self-dispersible pigment, and hence the ratio of the color developability was slightly poorer. As compared to the ink of Example 1, the ink of Example 30 included a self-dispersible pigment different in the structure of the functional group and included an alendronic acid salt, and hence color unevenness occurred in the image recorded on a recording medium containing calcium salt in a relatively large amount. As compared to the ink of Example 1, in the ink of Example 31 the counter ion was sodium ion and hence the water-soluble resin tended to be more easily insolubilized, the dot area was made smaller in a recording medium containing a calcium salt in a relatively large amount, and the color developability in the case where the application amount of the ink was small was slightly lower. As compared to the ink of Example 1, the ink of Example 25 had a surface tension of more than 38 mN/m, and hence the dot area was made smaller in a recording medium containing a calcium salt in a relatively large amount, and the color developability in the case where the application amount of the ink was small was slightly lower. As compared to the ink of Example 1, each of the inks of Examples 26 to 28, including a water-soluble organic solvent high in permeability, resulted in a larger dot area in a recording medium containing a calcium salt in a relatively large amount and a slightly high color developability in the case where the application amount of the ink was small.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-093360, filed Apr. 19, 2011, and Japanese Patent Application No. 2012-076529, filed Mar. 29, 2012 which are hereby incorporated by reference herein in their entirety.

What is claimed is:

1. An ink comprising:
an organic pigment comprising a self-dispersible pigment to the surface of particles of which a ((benzoylamino)-methane-1, 1-diyl)bisphosphonic acid or a salt thereof is bonded;
a water-soluble resin, wherein the acid value of the water-soluble resin is 100 mg KOH/g or more to 160 mg KOH/g or less; and
a surfactant comprising an the ethylene oxide adduct of a higher alcohol selected from the group consisting of a linear primary alcohol, a linear secondary alcohol, and an isoalkyl alcohol,
wherein the HLB value of the surfactant as determined by a Griffin method is 13.0 or more, and
wherein the mass ratio of the content (% by mass) of the surfactant in the ink to the content (% by mass) of the water-soluble resin in the ink is 0.07 or more to 0.70 or less.

2. The ink according to claim 1, wherein the number of the carbon atoms in the higher alcohol is 16 or more to 22 or less.

3. The ink according to claim 1, wherein the surface charge amount of the self-dispersible pigment is more than 1.5 µmol/m² to 8.0 µmol/m² or less.

4. The ink according to claim 1, further comprising a water-soluble organic solvent represented by the general formula (1):

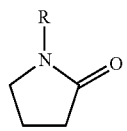

(1)

wherein in the general formula (1), R represents a hydrogen atom or a hydroxyalkyl group having 1 to 5 carbon atoms.

5. The ink according to claim 1, wherein the content (% by mass) of the self-dispersible pigment in the ink is 0.1% by mass or more to 10.0% by mass or less.

6. The ink according to claim 1, wherein the content (% by mass) of the water-soluble resin in the ink is 1.0% by mass or more to 5.0% by mass or less.

7. The ink according to claim 1, wherein the content (% by mass) of the surfactant in the ink is 0.10% by mass or more to 2.5% by mass or less.

8. The ink according to claim 1, wherein the mass ratio of the content of the water-soluble resin in the ink to the content of the self-dispersible pigment in the ink is set at 0.25 or more to 0.75 or less.

9. The ink according to claim 1, wherein the HLB value of the surfactant as determined by a Griffin method is 20.0 or less.

10. An ink cartridge comprising an ink and an ink storage portion storing the ink, wherein the ink comprises the ink according to claim 1.

11. An ink jet recording method recording an image on a recording medium by ejecting an ink from an ink jet recording head, wherein the ink comprises the ink according to claim 1.

* * * * *